United States Patent
Li et al.

(10) Patent No.: US 11,526,668 B2
(45) Date of Patent: Dec. 13, 2022

(54) METHOD AND APPARATUS FOR OBTAINING WORD VECTORS BASED ON LANGUAGE MODEL, DEVICE AND STORAGE MEDIUM

(71) Applicant: BEIJING BAIDU NETCOM SCIENCE AND TECHNOLOGY CO., LTD., Beijing (CN)

(72) Inventors: Zhen Li, Beijing (CN); Yukun Li, Beijing (CN); Yu Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 293 days.

(21) Appl. No.: 17/095,955

(22) Filed: Nov. 12, 2020

(65) Prior Publication Data

US 2021/0374343 A1  Dec. 2, 2021

(30) Foreign Application Priority Data

May 29, 2020 (CN) .......................... 202010479752.6

(51) Int. Cl.
*G06F 40/279* (2020.01)
*G06F 16/9032* (2019.01)
(Continued)

(52) U.S. Cl.
CPC ...... *G06F 40/279* (2020.01); *G06F 16/90332* (2019.01); *G06F 40/205* (2020.01);
(Continued)

(58) Field of Classification Search
CPC . G06F 40/279; G06F 40/205; G06F 16/90332
See application file for complete search history.

(56) References Cited

U.S. PATENT DOCUMENTS

2018/0336884 A1  11/2018  Sriram et al.

FOREIGN PATENT DOCUMENTS

| CN | 111310471 A | * | 6/2020 |
| CN | 111324744 A | * | 6/2020 |

(Continued)

OTHER PUBLICATIONS

Levine et al., "SenseBERT" Driving Some Sense into BERT, arxiv.org, Cornell University Library, 201 Olin Library Cornell University Ithaca, NY, May 18, 2020, XP081664118, 12 pages. (Year: 2020).*

(Continued)

*Primary Examiner* — Anne L Thomas-Homescu
(74) *Attorney, Agent, or Firm* — Brooks Kushman P.C.

(57) ABSTRACT

A method and apparatus for obtaining word vectors based on a language model, a device and a storage medium are disclosed, which relates to the field of natural language processing technologies in artificial intelligence. An implementation includes inputting each of at least two first sample text language materials into the language model, and outputting a context vector of a first word mask in each first sample text language material via the language model; determining the word vector corresponding to each first word mask based on a first word vector parameter matrix, a second word vector parameter matrix and a fully connected matrix respectively; and training the language model and the fully connected matrix based on the word vectors corresponding to the first word masks in the at least two first sample text language materials, so as to obtain the word vectors.

20 Claims, 5 Drawing Sheets

(51) Int. Cl.
    *G06N 20/00*     (2019.01)
    *G06F 40/205*     (2020.01)
    *G06K 9/62*     (2022.01)

(52) U.S. Cl.
    CPC ......... *G06K 9/6256* (2013.01); *G06K 9/6277* (2013.01); *G06N 20/00* (2019.01)

(56) References Cited

FOREIGN PATENT DOCUMENTS

| | | | |
|---|---|---|---|
| CN | 113505591 A | * | 10/2021 |
| JP | 2020030753 A | | 2/2020 |

OTHER PUBLICATIONS

Ji et al., "Levering Concept-Enchanced Pre-Training Model and Masked-Entity Language Model for Named Entity Disambiguation", IEEE Access, IEEE, USA, vol. 8, May 12, 2020, pp. 100469-100484. (Year: 2020).*

Sun et al., "ERNIE: Enhanced Representation through Knowledge Integration", Computer Science, Cornell University Library, 201 Olin Library Cornell University Ithaca, NY, Apr. 19, 2019, pp. 1-8, XP081171557, 8 pages. (Year: 2019).*

Sun et al., "ERNIE 2.0: A Continual Pre-training Framework for Language Understanding", arxiv.org, Cornell University Library, Olin Library Cornell University, Ithaca, NY, Jul. 29, 2019, XP081536565, 8 pages. (Year: 2019).*

Qi et al., "A Survey on Contextual Embeddings", https://arxiv.org/abs/2003.07278. (Year: 2020).*

Zhang, Z., Wu, Y., Zhao, H., Li, Z., Zhang, S., Zhou, X., & Zhou, X. (2020). Semantics-Aware BERT for Language Understanding. Proceedings of the AAAI Conference on Artificial Intelligence, 34(05), 9628-9635. (Year: 2020).*

Scarlini, B., Pasini, T., & Navigli, R. (2020). SensEmBERT: Context-Enhanced Sense Embeddings for Multilingual Word Sense Disambiguation. Proceedings of the AAAI Conference on Artificial Intelligence, 34(05), 8758-8765. (Year: 2020).*

Wiedemann et al., "Does BERT Make Any Sense? Interpretable Word Sense Disambiguation with Contextualized Embeddings", https://arxiv.org/abs/1909.10430. (Year: 2019).*

Liu et al., "A Survey on Contextual Embeddings", https://arxiv.org/abs/2003.07278. (Year: 2020).*

Extended European Search Report of European application No. 21162529.8 dated Sep. 1, 2021, 12 pages.

Levine et al., "SenseBERT" Driving Some Sense into BERT, arxiv.org, Cornell University Library, 201 Olin Library Cornell University Ithaca, NY, May 18, 2020, XP081664118, 12 pages.

Ji et al., "Levering Concept-Enchanced Pre-Training Model and Masked-Entity Language Model for Named Entity Disambiguation", IEEE Access, IEEE, USA, vol. 8, May 12, 2020, pp. 100469-100484.

Sun et al., "ERNIE: Enhanced Representation through Knowledge Integration", Computer Science, Cornell University Library, 201 Olin Library Cornell University Ithaca, NY, Apr. 19, 2019, pp. 1-8, XP081171557, 8 pages.

Sun et al., "ERNIE 2.0: A Continual Pre-training Framework for Language Understanding", arxiv.org, Cornell University Library, Olin Library Cornell University, Ithaca, NY, Jul. 29, 2019, XP081536565, 8 pages.

* cited by examiner

METHOD AND APPARATUS FOR OBTAINING WORD VECTORS BASED ON LANGUAGE MODEL, DEVICE AND STORAGE MEDIUM

CROSS-REFERENCE TO RELATED APPLICATIONS

The present application claims the priority of Chinese Patent Application No. 2020104797526, filed on May 29, 2020, with the title of "Method and apparatus for obtaining word vectors based on language model, device and storage medium". The disclosure of the above application is incorporated herein by reference in its entirety.

TECHNICAL FIELD

The present disclosure relates to the field of computer technologies, and particularly to a natural language processing technology in artificial intelligence, and in particular, to a method and apparatus for obtaining word vectors based on a language model, a device and a storage medium.

BACKGROUND

In the field of natural language processing (NLP) of Chinese, a self-supervised pre-training process of a language model is performed using a large amount of unsupervised text, and then, parameters of the language model are finely tuned using supervised task data, which is an advanced language-model training technology in the field of NLP.

In the prior art, in order to prevent the training effect of the language model from being influenced by the performance of a word segmentation unit, the self-supervised pre-training process of the language model is performed based on character granularity, such that it is difficult for the language model to learn information with greater semantic granularity (for example, words), an information leakage risk may exist, and the process of learning the semantics of the words by the language model may be damaged, thereby influencing the prediction performance of the language model.

SUMMARY

Various aspects of the present application provide a method and apparatus for obtaining word vectors based on a language model, a device and a storage medium, so as to avoid an information leakage risk caused by a learning process based on character granularity, enhance the capacity of the language model to learn word meaning information, increase the convergence speed of the word vectors, and improve a training effect.

According to a first aspect, there is provided a method for obtaining word vectors based on a language model, including: inputting each of at least two first sample text language materials into the language model, and outputting a context vector of a first word mask in each first sample text language material via the language model; for each first word mask in each first sample text language material, obtaining a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix; wherein the first word vector parameter matrix is a pre-trained word vector parameter matrix corresponding to the language model, and the second word vector parameter matrix is a pre-trained word vector parameter matrix corresponding to other language models; determining the word vector corresponding to each first word mask based on the first, second and third probability distribution matrices of the first word mask respectively; and training the language model and the fully connected matrix based on the word vectors corresponding to the first word masks in the at least two first sample text language materials until a first preset training completion condition is met, so as to obtain the trained language model and the word vectors of words corresponding to the first and second word vector parameter matrices.

According to a second aspect, there is provided an electronic device, comprising: at least one processor; and a memory communicatively connected with the at least one processor; wherein the memory stores instructions executable by the at least one processor, and the instructions are executed by the at least one processor to enable the at least one processor to perform a method for obtaining word vectors based on a language model, wherein the method comprises: inputting each of at least two first sample text language materials into the language model, and outputting a context vector of a first word mask in each first sample text language material; for each first word mask in each first sample text language material, obtaining a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix; wherein the first word vector parameter matrix is a pre-trained word vector parameter matrix corresponding to the language model, and the second word vector parameter matrix is a pre-trained word vector parameter matrix corresponding to other language models; determining the word vector corresponding to each first word mask based on the first, second and third probability distribution matrices of the first word mask respectively; and training the language model and the fully connected matrix based on the word vectors corresponding to the first word masks in the at least two first sample text language materials until a first preset training completion condition is met, with a set of the trained first and second word vector parameter matrices and the trained fully connected matrix as a set of word vectors.

According to a third aspect, there is provided a non-transitory computer-readable storage medium storing computer instructions therein, wherein the computer instructions are used to cause the computer to perform a method for obtaining word vectors based on a language model, wherein the method comprises: inputting each of at least two first sample text language materials into the language model, and outputting a context vector of a first word mask in each first sample text language material via the language model; for each first word mask in each first sample text language material, obtaining a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix; wherein the first word vector parameter matrix is a pre-trained word vector parameter matrix corresponding to the language model, and the second word vector parameter matrix is a pre-trained word vector parameter matrix corresponding to other language models; determining the word vector corresponding to each first word mask based on the first, second and third probability distribution matrices of the first word mask respectively; and training the language model and the fully connected matrix based on the word vectors corresponding to the first word masks in the at least two first sample text language materials until a first preset training completion condition is met, with a set of the trained first and second word vector parameter matrices and the trained fully connected matrix as a set of word vectors.

According to the above-mentioned technical solution, in the embodiment of the present application, each of the at least two first sample text language materials is input into the language model, and the context vector of the first word mask in each first sample text language material is output via the language model; for each first word mask in each first sample text language material, the first probability distribution matrix of the first word mask is obtained based on the context vector of the first word mask and the first word vector parameter matrix, the second probability distribution matrix of the first word mask is obtained based on the context vector of the first word mask and the second word vector parameter matrix, and the third probability distribution matrix of the first word mask is obtained based on the context vector of the first word mask and the fully connected matrix; then, the word vector corresponding to each first word mask is determined based on the first, second and third probability distribution matrices of the first word mask respectively; then, the language model and the fully connected matrix are trained based on the word vectors corresponding to the first word masks in the at least two first sample text language materials until the first preset training completion condition is met, so as to obtain the trained language model and the word vectors of the words corresponding to the first and second word vector parameter matrices. In the embodiment of the present application, by introducing the second word vector parameter matrix corresponding to other language models, the language model and the word vectors are trained jointly based on the pre-trained first and second word vector parameter matrices in conjunction with various high-quality word vectors, such that the language model learns multi-source high-quality word meaning information, the capacity of the language model to learn the word meaning information is enhanced, and the prediction performance of the language model is improved.

In addition, with the technical solution of the present application, the language model and the word vectors are trained jointly in conjunction with various high-quality word vectors, the convergence speed of the language model and the word vectors is increased, and the training effect is improved.

In addition, with the technical solution of the present application, the language model and the word vectors are trained with the sample text language materials including the word mask, and since the word vectors contain richer semantic information representation compared with character vectors, when the word vectors are modeled by means of the word mask based on contexts, the process of modeling the word meaning information by the language model is enhanced, the capacity of the language model to learn the word meaning information is enhanced, and the information leakage risk possibly caused by character-based full word coverage may be avoided effectively.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

In order to more clearly explain the technical solutions of the embodiments of the present application, the drawings to be used in the descriptions of the embodiments or the prior art are briefly introduced as follows. Apparently, the following drawings illustrate some embodiments of the present application, and a person skilled in the art can obtain other drawings from these drawings without any creative effort. The drawings are only used for better understanding the present solution and do not constitute a limitation of the present application. In the drawings.

DETAILED DESCRIPTION

Figure 1:
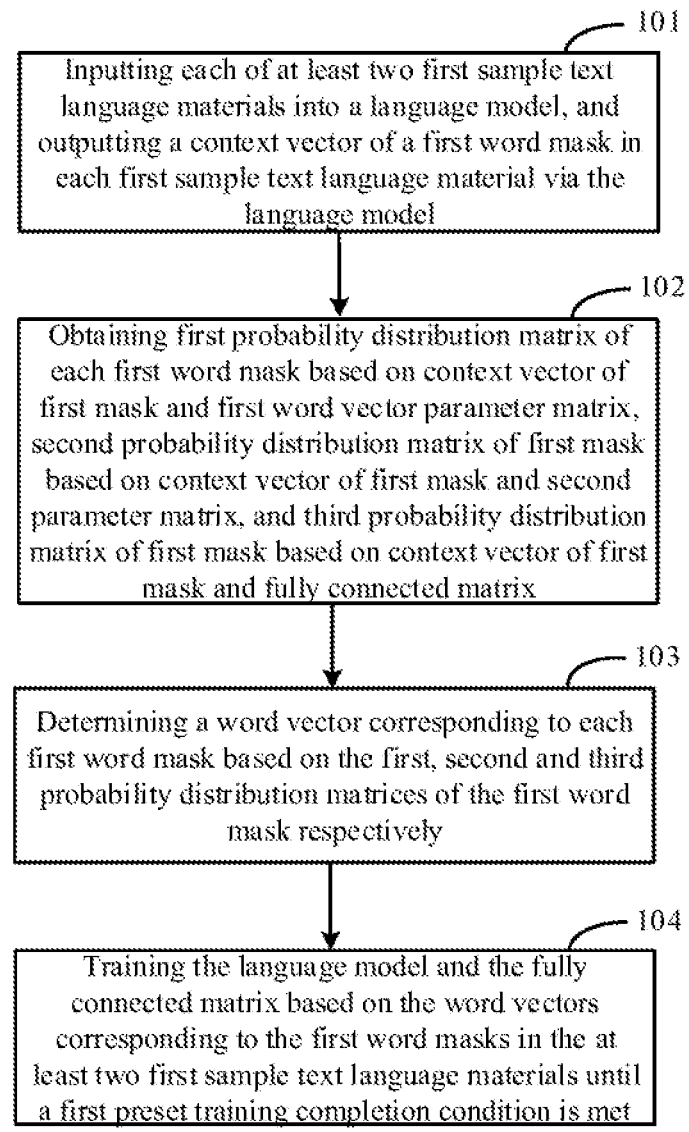
FIG. 1 is a schematic diagram according to a first embodiment of the present application.

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Apparently, the embodiments to be described are merely a part rather than all of the embodiments of the present application. All other embodiments obtained by a person of ordinary skill in the art based on the embodiments of the present application without creative efforts shall fall within the protection scope of the present application.

It should be noted that a terminal in the embodiments of the present application may include, but is not limited to, a mobile phone, a personal digital assistant (PDA), a wireless handheld device, a tablet computer, a personal computer (PC), an MP3 player, an MP4 player, a wearable device (for example, smart glasses, smart watches, smart bracelets, or the like), a smart home device, and other smart devices.

In addition, the term "and/or" only describes an association relationship between associated objects, and indicates that three relationships may exist. For example, A and/or B may indicate three cases: only A exists; both A and B exist; and only B exists. In addition, in this specification, the symbol "," generally indicates that associated objects before and after have a relationship of "or".

In the prior art, the self-supervised pre-training process of a language model is performed based on character granularity, such that it is difficult for the language model to learn information with greater semantic granularity (for example, words), an information leakage risk may exist, and the process of learning the semantics of words by the language model may be damaged, thereby influencing the prediction performance of the language model.

For example, in the pre-training process of an enhanced representation from knowledge Integration (ERNIE) model in an existing language model, the ERNIE model learns the expression of entities by means of character-based full word coverage. However, the character-based full word coverage method still does not explicitly introduce information with greater semantic granularity, for example, word vectors; in addition, an information leakage risk may exist; for example, for a text "Harbin is the provincial capital of the Heilongjiang province", the characters "ha", "r" and "bin" are replaced by three masks respectively to obtain "[mask][mask][mask] is the provincial capital of the Heilongjiang province", and the ERNIE model is expected to learn that three [mask]s correspond to the characters "ha", "r" and "bin", which is equivalent to informing the ERNIE model in advance that information to be predicted consists of three characters, and such information may destroy the process of learning the semantics of the words by the model.

In order to solve the above-mentioned problems, the present application provides a method and apparatus for obtaining word vectors based on a language model, an electronic device and a readable storage medium, so as to avoid an information leakage risk caused by a learning process based on character granularity, enhance the capacity of the language model to learn word meaning information, increase the convergence speed of the word vectors, and improve a training effect.

FIG. 1 is a schematic diagram according to a first embodiment of the present application.

101: inputting each of at least two first sample text language materials into a language model, and outputting a context vector of a first word mask in each first sample text language material via the language model.

102: for each first word mask in each first sample text language material, obtaining a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix.

The first word vector parameter matrix is a pre-trained word vector parameter matrix corresponding to the language model, and the second word vector parameter matrix is a pre-trained word vector parameter matrix corresponding to other language models. The fully connected matrix is an initialized untrained matrix.

103: determining the word vector corresponding to each first word mask based on the first, second and third probability distribution matrices of the first word mask respectively.

104: training the language model and the fully connected matrix based on the word vectors corresponding to the first word masks in the at least two first sample text language materials until a first preset training completion condition is met, so as to obtain the trained language model and the trained fully connected matrix, with a set of the trained first and second word vector parameter matrices and the trained fully connected matrix as a set of word vectors.

During implementation, parameter values of the first and second word vector parameter matrices may be kept unchanged, and the language model and the fully connected matrix are trained based on the word vectors corresponding to the first word masks in the at least two first sample text language materials; that is, parameter values in the language model and the fully connected (FC) matrix are adjusted until the first preset training completion condition is met.

In the embodiment of the present application, possible words may be included in a vocabulary, the first and second word vector parameter matrices contain word vectors of a plurality of words in the vocabulary respectively, and have the same dimension which may be expressed as [dimension of word vector, size of vocabulary], and the size of the vocabulary is the number of the words contained in the vocabulary. The first probability distribution matrix is used for representing probability values of the first word mask corresponding to the word vectors in the vocabulary respectively based on the first word vector parameter matrix, and the second probability distribution matrix is used for representing probability values of the first word mask corresponding to the word vectors in the vocabulary respectively based on the second word vector parameter matrix.

In an example, assuming that the number (also referred to as sample number) of the words corresponding to the first word mask involved in the training process is batch_size, the dimension of the word vector of each word is embedding_size, and the size of the vocabulary is vocab_size, the dimension of the word vector output by the language model is [batch_size, embedding_size], the dimensions of the first and second word vector parameter matrices as well as the fully connected matrix are all [embedding_size, vocab_size], and the dimensions of the first, second and third probability distribution matrices are all [batch_size, vocab_size].

Since pre-trained and corresponding to the language model, the first word vector parameter matrix may accurately represent the word vector of each word in the vocabulary. Since pre-trained and corresponding to the other language models, the second word vector parameter matrix may also accurately represent the word vector of each word in the vocabulary. In order to enable the language model to learn more and richer semantic information, the word vectors (the second word vector parameter matrix) trained based on other language models are introduced to further train the language model.

In this embodiment, since the first and second word vector parameter matrices are pre-trained and correspond to different language models, in order to better fuse the word vectors in the word vector parameter matrices corresponding to two different language models, the FC matrix is introduced to assist and supplement the fused word vectors of the word vector parameter matrices corresponding to the two different language models, thereby further improving the learning effect of the language model on the corresponding word vectors of the word vector parameter matrices corresponding to the two different language models.

The above-mentioned 101-104 may be an iterative execution process, the language model and the fully connected matrix are trained by executing 101-104 iteratively, and when the first preset training completion condition is met, the training process of the language model and the fully connected matrix is completed, and the word vector corresponding to the first word mask in a text may be accurately output by the trained language model based on 102-103.

It should be noted that part or all of execution subjects of 101-104 may be configured as an application located at a local terminal, or a functional unit, such as a plug-in or software development kit (SDK) provided in the application located at the local terminal, or the like, or a processing engine located at a network-side server, which is not particularly limited in this embodiment.

It may be understood that the application may be configured as a native application (nativeApp) installed at the terminal, or a web application (webApp) of a browser at the terminal, which is not limited in this embodiment.

In this embodiment, by introducing the second word vector parameter matrix corresponding to other language models, the language model and the word vectors are trained jointly based on the pre-trained first and second word vector parameter matrices in conjunction with various high-quality word vectors, such that the language model learns multi-source high-quality word meaning information, the capacity of the language model to learn the word meaning information is enhanced, and the prediction performance of the language model is improved.

In addition, with the technical solution of the present application, the language model and the word vectors are trained jointly in conjunction with various high-quality word vectors, the convergence speed of the language model and the word vectors is increased, and the training effect is improved.

In addition, with the technical solution of the present application, the language model and the word vectors are trained with the sample text language materials including the word mask, and since the word vectors contain richer semantic information representation compared with character vectors, when the word vectors are modeled by means of the word mask based on contexts, the process of modeling the word meaning information by the language model is enhanced, the capacity of the language model to learn the word meaning information is enhanced, and the information leakage risk possibly caused by character-based full word coverage may be avoided effectively.

Optionally, in a possible implementation of this embodiment, in 102, matrix multiplication may be performed on the context vector of the first word mask and the first word vector parameter matrix to obtain the correlation between the context vector of each first word mask and each word vector in the first word vector parameter matrix, thereby obtaining the first probability distribution matrix of the first word mask corresponding to each word vector in the first word vector parameter matrix.

Optionally, in a possible implementation of this embodiment, in 102, matrix multiplication may be performed on the context vector of the first word mask and the second word vector parameter matrix to obtain the correlation between the context vector of each first word mask and each word vector in the second word vector parameter matrix, thereby obtaining the second probability distribution matrix of the first word mask corresponding to each word vector in the second word vector parameter matrix.

Optionally, in a possible implementation of this embodiment, in 102, matrix multiplication may be performed on the context vector of the first word mask and the fully connected matrix to obtain the third probability distribution matrix of the first word mask corresponding to each word vector in the fully connected matrix.

In this implementation, matrix multiplication is performed on the context vector of the first word mask and the first and second word vector parameter matrices and the fully connected matrix respectively to obtain probability distribution of the first word mask corresponding to the plurality of word vectors based on the first and second word vector parameter matrices and the fully connected matrix respectively, thereby comprehensively determining the word vector corresponding to the first word mask based on the first, second and third probability distribution matrices.

Optionally, in a possible implementation of this embodiment, in 103, the first, second and third probability distribution matrices of each first word mask may be added to obtain a total probability distribution matrix of the first word mask, and then, probability values in the total probability distribution matrix of the first word mask are normalized, for example, by a normalization index function (softmax), so as to obtain a plurality of normalized probability values of the first word mask corresponding to the plurality of word vectors, and then, the word vector corresponding to the first word mask is determined based on the plurality of normalized probability values of the first word mask corresponding to the plurality of word vectors. Since the probability values in the total probability distribution matrix are normalized by softmax, the first and second word vector parameter matrices may also be referred to as softmax parameter matrices or softmax word vector parameter matrices.

In this implementation, the probability values of the total probability distribution matrix obtained by adding the first, second and third probability distribution matrices are normalized, and based on the normalized probability values, for example, the word vector with the highest probability value may be selected as the word vector corresponding to the first word mask, thereby accurately determining the word vector corresponding to the first word mask.

Optionally, in a possible implementation of this embodiment, the first preset training completion condition may be set according to an actual requirement, and for example, may include any one or more of the following conditions: the perplexity of the word vector output by the language model corresponding to the First sample text language materials reaches a first preset threshold value; the words in the at least two first sample text language materials replaced by the first word masks include a plurality of words (which may be partial or all words) in the vocabulary, and after the plurality of normalized probability values of each first word mask corresponding to the plurality of word vectors are obtained with 103, the normalized probability value of the highest probability value of all the first word masks involved in the training process is maximized; and the number of training times (i.e., the number of iterative execution times of 101-104) of the language model and the fully connected matrix reaches a second preset threshold value.

Optionally, before the above-mentioned first embodiment, it is also possible to pre-train an initialized language model and an initialized first word vector parameter matrix until a second preset training completion condition is met, so as to obtain the language model and the first word vector parameter matrix.

In this embodiment, after the initialized language model and the initialized first word vector parameter matrix are pre-trained to obtain the trained language model and the trained first word vector parameter matrix, the language model and the first word vector parameter matrix are further trained in conjunction with word vector parameter matrices of other language models, such that the training speed of the language model and the first word vector parameter matrix may be increased, and the training effect may be improved.

Figure 2:
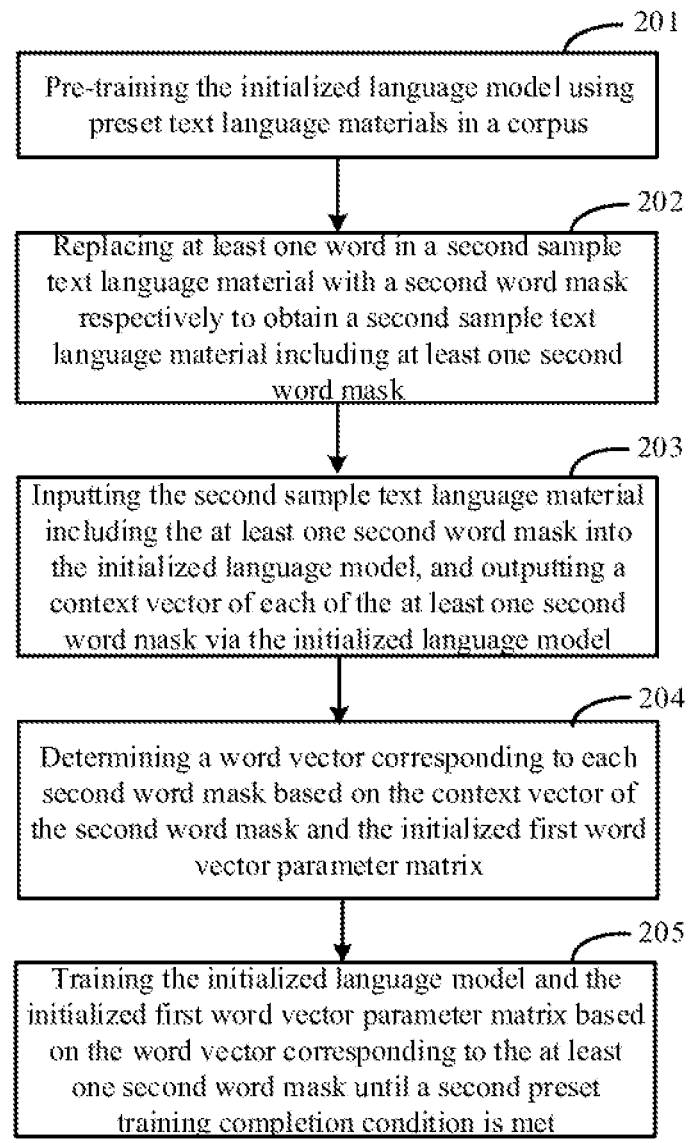
FIG. 2 is a schematic diagram according to a second embodiment of the present application.

FIG. 2 is a schematic diagram according to a second embodiment of the present application.

The step of training the initialized language model and the initialized first word vector parameter matrix until the second preset training completion condition is met may be implemented by:

201: pre-training the initialized language model using preset text language materials in a corpus.

The pre-training the language model using the preset text language materials in the corpus enables the language model to learn words, entities and entity relationships in the text language materials.

202: replacing at least one word in a second sample text language material with a second word mask respectively to obtain a second sample text language material including at least one second word mask.

The second sample text language material may be the same as or different from the first sample text language material. In addition, the second sample text language material may be one of the preset text language materials in the corpus, or another text language material different from the preset text language materials in the corpus.

Optionally, in a possible implementation of this embodiment, when the at least one word in the second sample text language material is replaced with the second word mask respectively, a context of the second word mask is still represented based on characters.

203: inputting the second sample text language material including the at least one second word mask into the initialized language model, and outputting a context vector of each of the at least one second word mask via the initialized language model.

204: determining a word vector corresponding to each second word mask based on the context vector of the second word mask and the initialized first word vector parameter matrix.

205: training the initialized language model and the initialized first word vector parameter matrix based on the word vector corresponding to the at least one second word mask until the second preset training completion condition is met.

The above-mentioned 202-205 may be an iterative execution process, the initialized language model and the initialized first word vector parameter matrix are trained by executing 202-205 iteratively, and when the second preset training completion condition is met, the training process of the initialized language model and the initialized first word vector parameter matrix is completed.

For example, in an example, the initialized language model is pre-trained using the preset text language materials in the corpus, "Harbin is the provincial capital of the Heilongjiang province" and "Harbin is an icy and snowy city" are learned, the "Harbin" in the second sample text language material "Harbin is the provincial capital of the Heilongjiang province" is replaced by a word mask input into the language model, a word vector is output via the initialized language model, and the initialized language model and the initialized first word vector parameter matrix are trained based on whether the word vector output by the initialized language model is correct or not, such that after the training process is completed, the language model may correctly output the word vector of the "Harbin" when "[mask] is the provincial capital of the Heilongjiang province" is input into the language model.

In this embodiment, the second sample text language material including the second word mask is input into the language model, and the context vector of the second word mask is output via the initialized language model; then, the word vector corresponding to the second word mask is determined based on the context vector of the second word mask and the initialized first word vector parameter matrix; then, the initialized language model and the first word vector parameter matrix are trained based on the word vector corresponding to the second word mask until the second preset training completion condition is met, and the trained language model and the trained first word vector parameter matrix (also called as a first word vector) may be obtained; since the word vector contains richer semantic information representation compared with a character vector and introduces semantic information representation with greater granularity, when the word vector is modeled by means of the word mask based on contexts, the process of modeling word meaning information by the language model is enhanced, and the capacity of the language model to learn the word meaning information is enhanced.

In addition, in this embodiment, since the initialized language model is trained with the second sample text language material including the second word mask, the information leakage risk possibly caused by character-based full word coverage may be avoided effectively.

In addition, with this embodiment, the initialized language model and the initialized first word vector parameter matrix are jointly trained in combination, such that the convergence speed of the language model and the corresponding word vector of the first word vector parameter matrix may be increased, thereby improving the training effect.

Optionally, in a possible implementation of this embodiment, in 202, word segmentation may be performed on the second sample text language material, and each of the at least one word in the second sample text language material may be replaced with one second word mask based on the word segmentation result. The context of the second word mask is still represented based on characters in the second sample text language material except for the word replaced with the second mask.

In this implementation, word segmentation is performed on the second sample text language material, the words in the second sample text language material may be accurately determined according to the word segmentation result, and each of one or more of the words may be replaced by one second word mask, such that the word masks may be correctly set for training the initialized language model, the word vectors are modeled based on contexts by the initialized language model, the process of modeling word meaning information by the language model is enhanced, and the capacity of the language model to learn the word meaning information is enhanced.

Optionally, in a possible implementation of this embodiment, in 204, the context vector of the second word mask may be multiplied by the initialized first word vector parameter matrix to obtain the correlation between the context vector of each second word mask and each word vector in the initialized first word vector parameter matrix, thereby obtaining probability values of the second word mask corresponding to a plurality of word vectors; then, the probability values of the second word mask corresponding to the plurality of word vectors are normalized to obtain a plurality of normalized probability values of the second word mask corresponding to the plurality of word vectors, the word vector corresponding to the second word mask is then determined based on the plurality of normalized probability values, and specifically, the word vector with the highest normalized probability value is determined as the word vector corresponding to the second word mask.

In an implementation, possible words may be included in a vocabulary, the first word vector parameter matrix includes specific representation of a plurality of word vectors, the first word vectors correspond to word vectors of the words in the vocabulary respectively, the context vector of the second word mask is multiplied by the initialized first word vector parameter matrix to obtain the correlation between the context vector of each second word mask and each word vector in the initialized first word vector parameter matrix, thereby obtaining probability values of the second word mask corresponding to the word vectors in the vocabulary respectively; the probability values reflect probabilities that the second word mask corresponds to the word vectors.

In this implementation, the context vector of the second word mask is multiplied by the word vector parameter matrix, and the obtained probability values are normalized, for example, by softmax, and the probability values of each second word mask corresponding to the plurality of word vectors are normalized, such that based on the normalized probability values, the word vector with the highest probability value may be selected as the word vector corresponding to the second word mask, so as to determine the word vector corresponding to the second word mask. When the probability values of each second word mask corresponding to the plurality of word vectors are normalized by softmax, the first word vector parameter matrix may also be referred to as a softmax parameter matrix or softmax word vector parameter matrix.

Optionally, in a possible implementation of this embodiment, in 205, the second preset training completion condition may be set according to an actual requirement, and for example, may include any one or more of the following conditions: the perplexity of the word vector output by the language model corresponding to the second sample text language materials reaches a first preset threshold value; 202-302 are executed by utilizing a plurality of second sample text language materials, the words in the plurality of second sample text language materials replaced by the second word masks include a plurality of words (which may be partial or all words) in the vocabulary, and after the plurality of normalized probability values of each second word mask corresponding to the plurality of word vectors are obtained in 204, the normalized probability value of the highest probability value of all the second word masks involved in the training process is maximized; and the number of training times (i.e., the number of iterative execution times of 202-205) of the initialized language model and the initialized word vector parameter matrix reaches a second preset threshold value.

Optionally, in a possible implementation of this embodiment, the language model and the other language models in the above-mentioned embodiment may be any two language models of different types, or different language models of the same type trained with the preset text language materials in different corpora, and the specific types of the language model and the other language models are not limited in the embodiment of the present application.

For example, in an implementation, the language model may be an ERNIE model, and the other language models may be continuous bag of word (CBOW) models or language models different from the ERNIE model and the CBOW model.

The ERNIE model may learn the semantic representation of a complete concept by modeling prior semantic knowledge, such as entity concepts in mass data, or the like, and is pre-trained by masking semantic units, such as words and the entity concepts, or the like, such that the representation of semantic knowledge units by the ERNIE model is closer to the real world, and the ERNIE model directly models the prior semantic knowledge units while performing the modeling process based on character feature input, and has a strong semantic representation capability. In this embodiment, the ERNIE model is used as the language model, and the strong semantic representation capability of the ERNIE model may be used to model the words, the entities and the entity relationships in the mass data and learn the semantic knowledge of the real world, thereby enhancing the semantic representation capability of the model; for example, by learning the representation of the words and the entities, the ERNIE model is able to model the relationship between "Harbin" and "the Heilongjiang province" and learns "Harbin is the provincial capital of the Heilongjiang province" and "Harbin is an icy and snowy city".

The CBOW model may predict a word vector of an intermediate word based on a word vector corresponding to a context of the intermediate word; since the CBOW model does not include a hidden layer, the training speed is high, and since the calculation of each word vector by the CBOW model is only related to the context limited by a sliding window, the CBOW model has fewer training parameters, lower complexity and higher prediction accuracy. Meanwhile, the ERNIE model is further trained in conjunction with a pre-trained word vector parameter matrix (also called CBOW word vector) corresponding to the CBOW model and a pre-trained word vector parameter matrix (also called ERNIE-WORD word vector) corresponding to the ERNIE model, so as to learn word meaning information of the high-quality CBOW word vector and the high-quality ERNIE-WORD word vector at the same time, thus enhancing the capacity of the ERNIE model to learn the word meaning information, and improving the capacity of the ERNIE model to predict words in a text.

In addition, on the basis of the above-mentioned embodiment, after the trained language model is obtained when the first preset training completion condition is met, the language model may be further optimized with a supervised NLP task, so as to further improve the prediction performance of the language model in the NLP task.

Optionally, in a possible implementation of this embodiment, the trained language model may be used to perform the NLP task to obtain a processing result, and then, according to a difference between the processing result and annotated result information, parameter values in the language model are finely tuned until a preset condition is met, for example, the difference between the processing result and the annotated result information is smaller than a preset difference, and/or the number of training times of the language model reaches a preset number of times, or the like. The annotated result information is a correct processing result which is manually annotated in advance for the NLP task to be performed.

Specifically, the above-mentioned NLP task may be any one or more of NLP tasks, such as classification, matching, sequence annotation, or the like, which is not particularly limited in this embodiment. Correspondingly, the processing result is a processing result of the specific NLP task, for example, a classification result, a matching result, a sequence annotation result, or the like.

In an implementation, the NLP task may be performed by using the trained language model in conjunction with other network models for implementing classification, matching and sequence annotation, for example, a convolutional neural network (CNN), a long short term memory (LSTM) model and a bag of word (BOW) model, so as to obtain the processing result; for example, the other network models for implementing classification, matching and sequence annotation may perform these processing tasks based on the output of the language model, so as to obtain the corresponding classification result, the corresponding matching result, the corresponding sequence annotation result and other processing results.

In this embodiment, since the word vector parameter matrix is avoided, the language model may be further optimized with the NLP task with supervision data (i.e., the annotated result information) without changing the overall structure of the language model, thus improving the prediction performance of the language model, and facilitating iterative optimization of the language model according to each NLP task.

It should be noted that for simplicity of description, the above-mentioned embodiments of the method are described as combinations of a series of acts, but those skilled in the art should understand that the present application is not limited by the described order of acts, as some steps may be performed in other orders or simultaneously according to the present application. Further, those skilled in the art should also understand that the embodiments described in this specification are preferred embodiments and that acts and modules referred to are not necessary for the present application.

In the above-mentioned embodiments, the descriptions of the respective embodiments have respective emphasis, and for parts that are not described in detail in a certain embodiment, reference may be made to the related descriptions of other embodiments.

Figure 3:
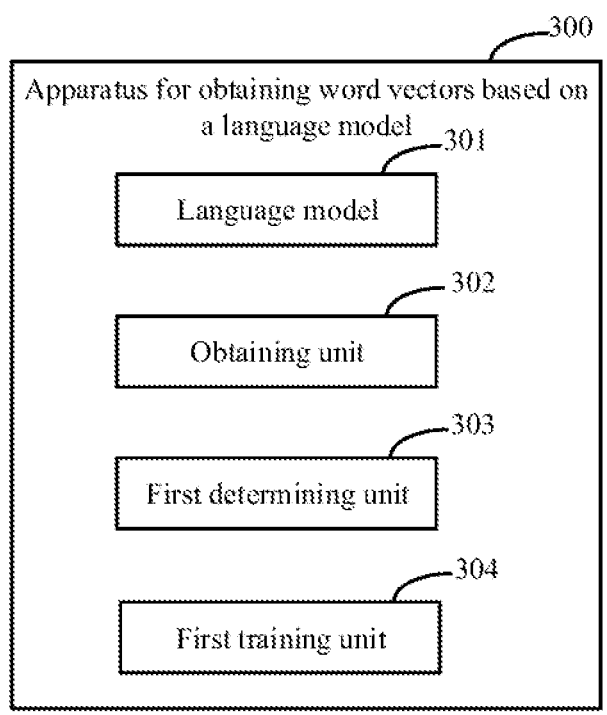
FIG. 3 is a schematic diagram according to a third embodiment of the present application.

FIG. 3 is a schematic diagram according to a third embodiment of the present application. An apparatus 300 for obtaining word vectors based on a language model according to this embodiment may include the language model 301, an obtaining unit 302, a first determining unit 303 and a first training unit 304. The language model 301 is configured to receive each of at least two first sample text language materials and output a context vector of a first word mask in each first sample text language material; the obtaining unit 302 is configured to obtain, for each first word mask in each first sample text language material, a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix; wherein the first word vector parameter matrix is a pre-trained word vector parameter matrix corresponding to the language model, and the second word vector parameter matrix is a pre-trained word vector parameter matrix corresponding to other language models; the first determining unit 303 is configured to determine the word vector corresponding to each first word mask based on the first, second and third probability distribution matrices of the first word mask respectively; the first training unit 304 is configured to train the language model and the fully connected matrix based on the word vectors corresponding to the first word masks in the at least two first sample text language materials until a first preset training completion condition is met, with a set of the trained first and second word vector parameter matrices and the trained fully connected matrix as a set of word vectors.

It should be noted that part or all of execution subjects of the training apparatus for the language model according to this embodiment may be configured as an application located at a local terminal, or a functional unit, such as a plug-in or software development kit (SDK) provided in the application located at the local terminal, or the like, or a processing engine located at a network-side server, which is not particularly limited in this embodiment.

It may be understood that the application may be configured as a native application (nativeApp) installed at the terminal, or a web application (webApp) of a browser at the terminal, which is not limited in this embodiment.

In this embodiment, by introducing the second word vector parameter matrix corresponding to other language models, the language model and the word vectors are trained jointly based on the pre-trained first and second word vector parameter matrices in conjunction with various high-quality word vectors, such that the language model learns multi-source high-quality word meaning information, the capacity of the language model to learn the word meaning information is enhanced, and the prediction performance of the language model is improved.

In addition, with the technical solution of the present application, the language model and the word vectors are trained jointly in conjunction with various high-quality word vectors, the convergence speed of the language model and the word vectors is increased, and the training effect is improved.

In addition, with the technical solution of the present application, the language model and the word vectors are trained with the sample text language materials including the word mask, and since the word vectors contain richer semantic information representation compared with character vectors, when the word vectors are modeled by means of the word mask based on contexts, the process of modeling the word meaning information by the language model is enhanced, the capacity of the language model to learn the word meaning information is enhanced, and the information leakage risk possibly caused by character-based full word coverage may be avoided effectively.

Optionally, in a possible implementation of this embodiment, the obtaining unit 302 is specifically configured to multiply the context vector of the first word mask by the first word vector parameter matrix to obtain the first probability distribution matrix of the first word mask, and/or configured to multiply the context vector of the first word mask by the second word vector parameter matrix to obtain the second probability distribution matrix of the first word mask, and/or configured to multiply the context vector of the first word mask with the fully connected matrix to obtain the third probability distribution matrix of the first word mask.

Figure 4:
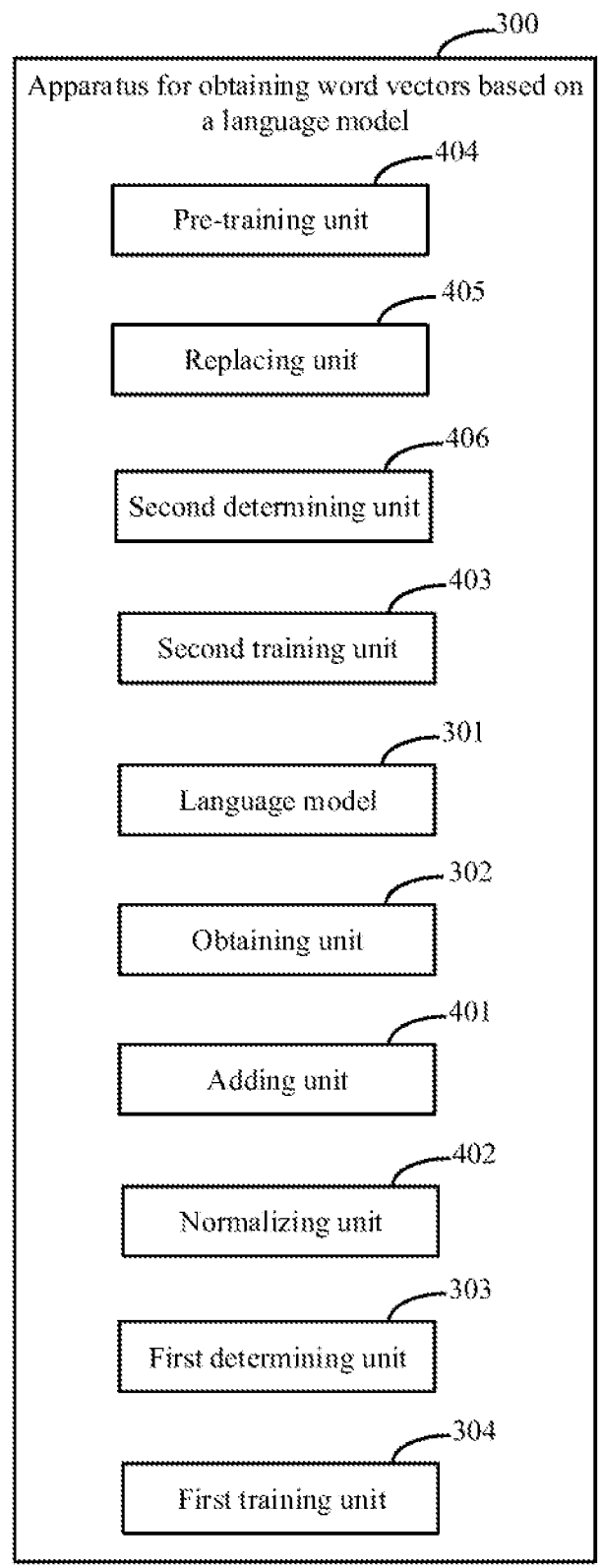
FIG. 4 is a schematic diagram according to a fourth embodiment of the present application.

FIG. 4 is a schematic diagram according to a fourth embodiment of the present application, and as shown in FIG. 4, on the basis of the embodiment shown in FIG. 3, the apparatus 300 for obtaining the word vectors based on the language model according to this embodiment may further include an adding unit 401 and a normalizing unit 402. The adding unit 401 is configured to add the first, second and third probability distribution matrices to obtain a total probability distribution matrix; the normalization unit 402 is configured to normalize probability values in the total probability distribution matrix to obtain a plurality of normalized probability values of the first word mask corresponding to a plurality of word vectors. Correspondingly, in this embodiment, the first determining unit 303 is specifically configured to determine the word vector corresponding to the first word mask based on the plurality of normalized probability values.

Optionally, referring to FIG. 4 again, the apparatus 300 for obtaining the word vectors based on the language model according to the above-mentioned embodiment may further include a second training unit 403 configured to train an initialized language model and an initialized first word vector parameter matrix until a second preset training completion condition is met, so as to obtain the language model 301 and the first word vector parameter matrix.

Optionally, referring to FIG. 4 again, the apparatus 300 for obtaining the word vectors based on the language model according to the above-mentioned embodiment may further include a pre-training unit 404, a replacing unit 405 and a second determining unit 406. The pre-training unit 404 is configured to pre-train the initialized language model using preset text language materials in a corpus; the replacing unit 405 is configured to replace at least one word in a second sample text language material with a second word mask respectively to obtain a second sample text language material including at least one second word mask to be input into the initialized language model; the initialization language model is configured to output a context vector of each of the at least one second word mask based on the second sample text language material which is input by the replacing unit and includes the at least one second word mask; the second determining unit 406 is configured to determine a word vector corresponding to each second word mask based on the context vector of the second word mask and the initialized first word vector parameter matrix; the second training unit 403 is specifically configured to train the initialized language model and the initialized first word vector parameter matrix based on the word vector corresponding to the at least one second word mask until the second preset training completion condition is met.

Optionally, in a possible implementation of this embodiment, the replacing unit 405 is specifically configured to perform word segmentation on the second sample text language material, and replace each of the at least one word in the second sample text language material with one second word mask based on the word segmentation result.

Optionally, in a possible implementation of this embodiment, the language model and the other language models in the above-mentioned embodiment may be any two language models of different types, or different language models of the same type trained with the preset text language materials in different corpora, and the specific types of the language model and the other language models are not limited in the embodiment of the present application.

For example, in an implementation, the language model may be an ERNIE model, and the other language models may be CBOW models or language models different from the ERNIE model and the CBOW model.

It should be noted that the method according to the embodiments corresponding to FIGS. 1 to 2 may be implemented by the apparatus for obtaining the word vectors based on the language model according to the above-mentioned embodiments of FIGS. 3 to 4. For detailed description, reference may be made to relevant contents in the embodiments corresponding to FIGS. 1 to 2, and the detailed description is not repeated herein.

According to embodiments of the present application, them are also provided an electronic device and a non-transitory computer readable storage medium with computer instructions stored thereon.

Figure 5:
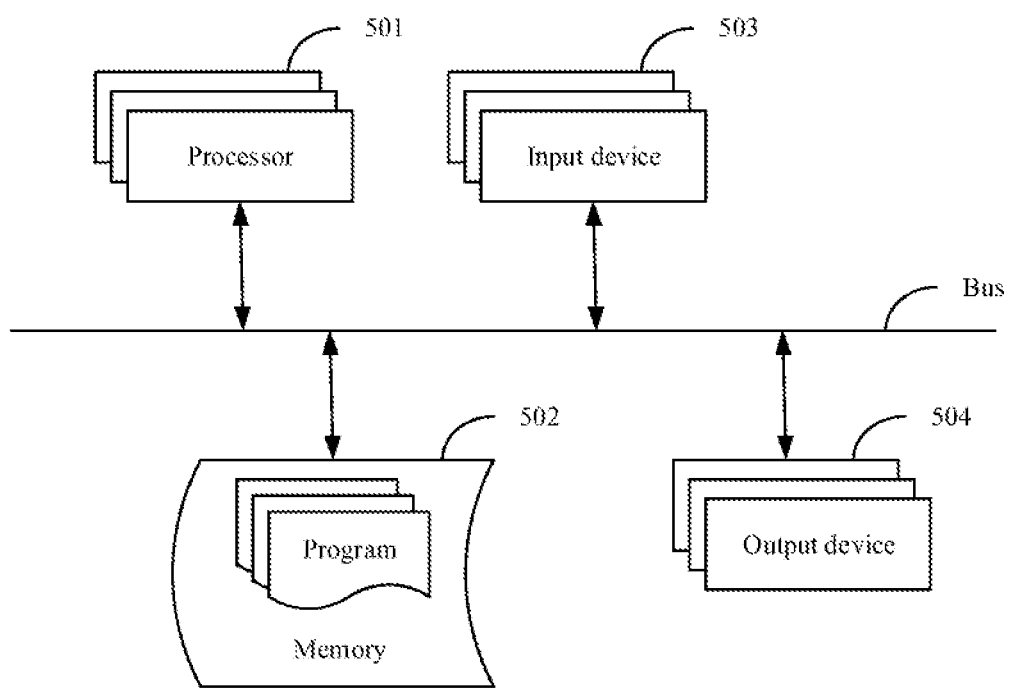
FIG. 5 is a schematic diagram of an electronic device for implementing a method for obtaining word vectors based on a language model according to the embodiments of the present application.

FIG. 5 is a schematic diagram of an electronic device for implementing a method for obtaining word vectors based on a language model according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 5, the electronic device includes one or more processors 501, a memory 502, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a graphical user interface (GUI) at an external input/output device, such as a display device coupled to the interface. In other implementations, multiple processors and/or multiple buses may be used with multiple memories, if desired. Also, multiple electronic devices may be connected, with each device providing some of necessary operations (for example, as a server array, a group of blade servers, or a multi-processor system). In FIG. 5, one processor 501 is taken as an example.

The memory 502 is configured as the non-transitory computer readable storage medium according to the present application. The memory stores instructions executable by the at least one processor to cause the at least one processor to perform a method for obtaining word vectors based on a language model according to the present application. The non-transitory computer readable storage medium according to the present application stores computer instructions for causing a computer to perform the method for obtaining word vectors based on a language model according to the present application.

The memory 502 which is a non-transitory computer readable storage medium may be configured to store non-transitory software programs, non-transitory computer executable programs and units, such as program instructions/units corresponding to the method for obtaining word vectors based on a language model according to the embodiments of the present application (for example, the language model 301, the obtaining unit 302, the first determining unit 303 and the first training unit 304 shown in FIG. 3). The processor 501 executes various functional applications and data processing of a server, that is, implements the method for obtaining word vectors based on a language model according to the above-mentioned embodiments, by running the non-transitory software programs, instructions, and units stored in the memory 502.

The memory 502 may include a program storage area and a data storage area, wherein the program storage area may store an operating system and an application program required for at least one function; the data storage area may store data created according to use of the electronic device for implementing the method for obtaining word vectors based on a language model according to the embodiments of the present application, or the like. Furthermore, the memory 502 may include a high-speed random access memory, or a non-transitory memory, such as at least one magnetic disk storage device, a flash memory device, or other non-transitory solid state storage devices. In some embodiments, optionally, the memory 502 may include memories remote from the processor 501, and such remote memories may be connected via a network to the electronic device for implementing the method for obtaining word vectors based on a language model according to the embodiments of the present application. Examples of such a network include, but are not limited to, the Internet, intranets, local area networks, mobile communication networks, and combinations thereof.

The electronic device for the method for obtaining word vectors based on a language model may further include an input device 503 and an output device 504. The processor 501, the memory 502, the input device 503 and the output device 504 may be connected by a bus or other means, and FIG. 5 takes the connection by a bus as an example.

The input device 503 may receive input numeric or character information and generate key signal input related to user settings and function control of the electronic device for implementing the method for obtaining word vectors based on a language model according to the embodiments of the present application, such as a touch screen, a keypad, a mouse, a track pad, a touch pad, a pointing stick, one or more mouse buttons, a trackball, a joystick, or the like. The output device 504 may include a display device, an auxiliary lighting apparatus (for example, an LED) and a tactile feedback apparatus (for example, a vibrating motor), or the like. The display device may include, but is not limited to, an LCD (liquid crystal display), an LED (light emitting diode) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, PLDs (programmable logic devices)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, language or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: an LAN (local area network), a WAN (wide area network) and the Internet.

A computer system may include a client and a server. Generally, the client and the server are remote from each other and interact through the communication network. The relationship between the client and the server is generated by virtue of computer programs which are run on respective computers and have a client-server relationship to each other.

With the technical solution according to the embodiment of the present application, by introducing the second word vector parameter matrix corresponding to other language models, the language model and the word vectors are trained jointly based on the pre-trained first and second word vector parameter matrices in conjunction with various high-quality word vectors, such that the language model learns multi-source high-quality word meaning information, the capacity of the language model to learn the word meaning information is enhanced, and the prediction performance of the language model is improved.

In addition, with the technical solution of the present application, the language model and the word vectors are trained jointly in conjunction with various high-quality word vectors, the convergence speed of the language model and the word vectors is increased, and the training effect is improved.

In addition, with the technical solution of the present application, the language model and the word vectors are trained with the sample text language materials including the word mask, and since the word vectors contain richer semantic information representation compared with character vectors, when the word vectors are modeled by means of the word mask based on contexts, the process of modeling the word meaning information by the language model is enhanced, the capacity of the language model to learn the word meaning information is enhanced, and the information leakage risk possibly caused by character-based full word coverage may be avoided effectively.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for obtaining word vectors based on a language model, comprising:

inputting each of at least two first sample text language materials into the language model, and outputting a context vector of a first word mask in each first sample text language material via the language model;

for each first word mask in each first sample text language material, obtaining a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix; wherein the first word vector parameter matrix is a pre-trained word vector parameter matrix corresponding to the language model, and the second word vector parameter matrix is a pre-trained word vector parameter matrix corresponding to other language models;

determining the word vector corresponding to each first word mask based on the first, second and third probability distribution matrices of the first word mask respectively; and training the language model and the fully connected matrix based on the word vectors corresponding to the first word masks in the at least two first sample text language materials until a first preset training completion condition is met, with a set of the trained first and second word vector parameter matrices and the trained fully connected matrix as a set of word vectors.

2. The method according to claim 1, wherein the obtaining a first probability distribution matrix of the first word mask based on the context vector of the first word mask and a first word vector parameter matrix comprises multiplying the context vector of the first word mask by the first word vector parameter matrix to obtain the first probability distribution matrix of the first word mask; and/or the obtaining a second probability distribution matrix of the first word mask based on the context vector of the first word mask and a second word vector parameter matrix comprises multiplying the context vector of the first word mask by the second word vector parameter matrix to obtain the second probability distribution matrix of the first word mask; and/or the obtaining a third probability distribution matrix of the first word mask based on the context vector of the first word mask and a fully connected matrix comprises multiplying the context vector of the first word mask by the fully connected matrix to obtain the third probability distribution matrix of the first word mask.

3. The method according to claim 1, wherein the determining the word vector corresponding to each first word mask based on the first, second and third probability distribution matrices of the first word mask respectively comprises:

adding the first, second and third probability distribution matrices of the first word mask to obtain a total probability distribution matrix of the first word mask;

normalizing probability values in the total probability distribution matrix of the first word mask to obtain a plurality of normalized probability values of the first word mask corresponding to a plurality of word vectors; and determining the word vector corresponding to the first word mask based on the plurality of normalized probability values of the first word mask corresponding to the plurality of word vectors.

4. The method according to claim 1, before the inputting a first sample text language material comprising a first word mask into the language model, and outputting a context vector of the first word mask via the language model, further comprising:

training an initialized language model and an initialized first word vector parameter matrix until a second preset training completion condition is met, so as to obtain the language model and the first word vector parameter matrix.

5. The method according to claim 4, wherein the training an initialized language model and an initialized first word vector parameter matrix until a second preset training completion condition is met comprising:

pre-training the initialized language model using preset text language materials in a corpus;

replacing at least one word in a second sample text language material with a second word mask respectively to obtain a second sample text language material comprising at least one second word mask;

inputting the second sample text language material comprising the at least one second word mask into the initialized language model, and outputting a context vector of each of the at least one second word mask via the initialized language model;

determining a word vector corresponding to each second word mask based on the context vector of the second word mask and the initialized first word vector parameter matrix; and training the initialized language model and the initialized first word vector parameter matrix based on the word vector corresponding to the at least one second word mask until the second preset training completion condition is met.

6. The method according to claim 5, wherein the replacing at least one word in a second sample text language material with a second word mask respectively comprising:

performing word segmentation on the second sample text language material, and replacing each of the at least one word in the second sample text language material with one second word mask based on the word segmentation result.

7. The method according to claim 1, wherein the language model comprises an enhanced representation from knowledge Integration (ERNIE) model; and/or the other language models comprise continuous bag of word (CBOW) models.

8. An electronic device, comprising:
at least one processor; and
a memory communicatively connected with the at least one processor;
wherein the memory stores instructions executable by the at least one processor, and the instructions are executed by the at least one processor to enable the at least one processor to perform a method for obtaining word vectors based on a language model, wherein the method comprises:

inputting each of at least two first sample text language materials into the language model, and outputting a context vector of a first word mask in each first sample text language material;

for each first word mask in each first sample text language material, obtaining a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix; wherein the first word vector parameter matrix is a pre-trained word vector parameter matrix corresponding to the language model, and the second word vector parameter matrix is a pre-trained word vector parameter matrix corresponding to other language models;

determining the word vector corresponding to each first word mask based on the first, second and third probability distribution matrices of the first word mask respectively; and training the language model and the fully connected matrix based on the word vectors corresponding to the first word masks in the at least two first sample text language materials until a first preset training completion condition is met, with a set of the trained first and second word vector parameter matrices and the trained fully connected matrix as a set of word vectors.

9. The electronic device according to claim 8, wherein the obtaining a first probability distribution matrix of the first word mask based on the context vector of the first word mask and a first word vector parameter matrix comprises multiplying the context vector of the first word mask by the first word vector parameter matrix to obtain the first probability distribution matrix of the first word mask; and/or the obtaining a second probability distribution matrix of the first word mask based on the context vector of the first word mask and a second word vector parameter matrix comprises multiplying the context vector of the first word mask by the second word vector parameter matrix to obtain the second probability distribution matrix of the first word mask; and/or the obtaining a third probability distribution matrix of the first word mask based on the context vector of the first word mask and a fully connected matrix comprises multiplying the context vector of the first word mask by the fully connected matrix to obtain the third probability distribution matrix of the first word mask.

10. The electronic device according to claim 8, wherein the determining the word vector corresponding to each first word mask based on the first, second and third probability distribution matrices of the first word mask respectively comprises:

adding the first, second and third probability distribution matrices of the first word mask to obtain a total probability distribution matrix of the first word mask;

normalizing probability values in the total probability distribution matrix of the first word mask to obtain a plurality of normalized probability values of the first word mask corresponding to a plurality of word vectors; and determining the word vector corresponding to the first word mask based on the plurality of normalized probability values of the first word mask corresponding to the plurality of word vectors.

11. The electronic device according to claim 8, before the inputting a first sample text language material comprising a first word mask into the language model, and outputting a context vector of the first word mask via the language model, further comprising:

training an initialized language model and an initialized first word vector parameter matrix until a second preset training completion condition is met, so as to obtain the language model and the first word vector parameter matrix.

12. The electronic device according to claim 11, wherein the training an initialized language model and an initialized first word vector parameter matrix until a second preset training completion condition is met comprising:

pre-training the initialized language model using preset text language materials in a corpus;

replacing at least one word in a second sample text language material with a second word mask respectively to obtain a second sample text language material comprising at least one second word mask;

inputting the second sample text language material comprising the at least one second word mask into the initialized language model, and outputting a context vector of each of the at least one second word mask via the initialized language model;

determining a word vector corresponding to each second word mask based on the context vector of the second word mask and the initialized first word vector parameter matrix; and training the initialized language model and the initialized first word vector parameter matrix based on the word vector corresponding to the at least one second word mask until the second preset training completion condition is met.

13. The electronic device according to claim 12, wherein the replacing at least one word in a second sample text language material with a second word mask respectively comprising:

performing word segmentation on the second sample text language material, and replacing each of the at least one word in the second sample text language material with one second word mask based on the word segmentation result.

14. The electronic device according to claim 8, wherein the language model comprises an enhanced representation from knowledge Integration (ERNIE) model; and/or the other language models comprise continuous bag of word (CBOW) models.

15. A non-transitory computer-readable storage medium storing computer instructions therein, wherein the computer instructions are used to cause the computer to perform a method for obtaining word vectors based on a language model, wherein the method comprises:

inputting each of at least two first sample text language materials into the language model, and outputting a context vector of a first word mask in each first sample text language material via the language model;

for each first word mask in each first sample text language material, obtaining a first probability distribution matrix of the first word mask based on the context vector of the first word mask and a first word vector parameter matrix, a second probability distribution matrix of the first word mask based on the context vector of the first word mask and a second word vector parameter matrix, and a third probability distribution matrix of the first word mask based on the context vector of the first word mask and a fully connected matrix; wherein the first word vector parameter matrix is a pre-trained word vector parameter matrix corresponding to the language model, and the second word vector parameter matrix is a pre-trained word vector parameter matrix corresponding to other language models;

determining the word vector corresponding to each first word mask based on the first, second and third probability distribution matrices of the first word mask respectively; and training the language model and the fully connected matrix based on the word vectors corresponding to the first word masks in the at least two first sample text language materials until a first preset training completion condition is met, with a set of the trained first and second word vector parameter matrices and the trained fully connected matrix as a set of word vectors.

16. The non-transitory computer-readable storage medium according to claim 15, wherein the obtaining a first probability distribution matrix of the first word mask based on the context vector of the first word mask and a first word vector parameter matrix comprises multiplying the context vector of the first word mask by the first word vector parameter matrix to obtain the first probability distribution matrix of the first word mask; and/or the obtaining a second probability distribution matrix of the first word mask based on the context vector of the first word mask and a second word vector parameter matrix comprises multiplying the context vector of the first word mask by the second word vector parameter matrix to obtain the second probability distribution matrix of the first word mask; and/or the obtaining a third probability distribution matrix of the first word mask based on the context vector of the first word mask and a fully connected matrix comprises multiplying the context vector of the first word mask by the fully connected matrix to obtain the third probability distribution matrix of the first word mask.

17. The non-transitory computer-readable storage medium according to claim 15, wherein the determining the word vector corresponding to each first word mask based on the first, second and third probability distribution matrices of the first word mask respectively comprises:

adding the first, second and third probability distribution matrices of the first word mask to obtain a total probability distribution matrix of the first word mask;

normalizing probability values in the total probability distribution matrix of the first word mask to obtain a plurality of normalized probability values of the first word mask corresponding to a plurality of word vectors; and determining the word vector corresponding to the first word mask based on the plurality of normalized probability values of the first word mask corresponding to the plurality of word vectors.

18. The non-transitory computer-readable storage medium according to claim 15, before the inputting a first sample text language material comprising a first word mask into the language model, and outputting a context vector of the first word mask via the language model, further comprising:

training an initialized language model and an initialized first word vector parameter matrix until a second preset training completion condition is met, so as to obtain the language model and the first word vector parameter matrix.

19. The non-transitory computer-readable storage medium according to claim 18, wherein the training an initialized language model and an initialized first word vector parameter matrix until a second preset training completion condition is met comprising:

pre-training the initialized language model using preset text language materials in a corpus;

replacing at least one word in a second sample text language material with a second word mask respectively to obtain a second sample text language material comprising at least one second word mask;

inputting the second sample text language material comprising the at least one second word mask into the initialized language model, and outputting a context vector of each of the at least one second word mask via the initialized language model;

determining a word vector corresponding to each second word mask based on the context vector of the second word mask and the initialized first word vector parameter matrix; and training the initialized language model and the initialized first word vector parameter matrix based on the word vector corresponding to the at least one second word mask until the second preset training completion condition is met.

20. The non-transitory computer-readable storage medium according to claim 19, wherein the replacing at least one word in a second sample text language material with a second word mask respectively comprising:

performing word segmentation on the second sample text language material, and replacing each of the at least one word in the second sample text language material with one second word mask based on the word segmentation result.

* * * * *